US 8,627,046 B2

(12) United States Patent
Ohtani et al.

(10) Patent No.: US 8,627,046 B2
(45) Date of Patent: *Jan. 7, 2014

(54) DATA PROCESSING DEVICE

(75) Inventors: Sugako Ohtani, Chiyoda-ku (JP); Hiroyuki Kondo, Chiyoda-ku (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,511

(22) Filed: May 23, 2011

(65) Prior Publication Data

US 2011/0238958 A1      Sep. 29, 2011

Related U.S. Application Data

(60) Continuation of application No. 12/472,193, filed on May 26, 2009, now Pat. No. 7,971,037, which is a continuation of application No. 11/878,737, filed on Jul. 26, 2007, now Pat. No. 7,555,635, which is a division of application No. 10/654,927, filed on Sep. 5, 2003, now Pat. No. 7,337,302.

(30) Foreign Application Priority Data

Sep. 6, 2002   (JP) .................................. 2002-261881

(51) Int. Cl.
   *G06F 7/52*      (2006.01)
(52) U.S. Cl.
   USPC ........................................................ 712/221
(58) Field of Classification Search
   None
   See application file for complete search history.

(56) References Cited

U.S. PATENT DOCUMENTS

| 3,684,879 | A |   | 8/1972  | Koehler |
|-----------|---|---|---------|---------|
| 4,817,048 | A | * | 3/1989  | Rawlinson et al. ........... 708/650 |
| 4,958,275 | A |   | 9/1990  | Yokouchi |
| 5,168,571 | A |   | 12/1992 | Hoover et al. |
| 5,185,870 | A |   | 2/1993  | Lenoski |
| 5,220,651 | A |   | 6/1993  | Larson |
| 5,272,660 | A |   | 12/1993 | Rossbach |
| 5,576,982 | A | * | 11/1996 | Wu et al. ........................ 708/211 |
| 5,604,499 | A | * | 2/1997  | Miyagoshi et al. ............. 341/67 |
| 5,604,876 | A |   | 2/1997  | Matsui |

(Continued)

FOREIGN PATENT DOCUMENTS

| EP | 0 438 961 A2 | 7/1991 |
| EP | 0 919 911 A2 | 6/1999 |
| JP | 2001-034472 A | 2/2001 |

OTHER PUBLICATIONS

"M32R-Family Mitsubishi Single-Chip Microcomputer Software Manual," Mitsubishi Electric Corporation, Ver 0.10, Jul. 1, 1998, pp. 2-16-17, 3-34-37 (with translation).

(Continued)

*Primary Examiner* — Eric Coleman
(74) *Attorney, Agent, or Firm* — Buchanan Ingersoll & Rooney PC (57) ABSTRACT

A data processing device has an instruction decoder, a control logic unit, and ALU. The instruction decoder decodes instruction codes of an arithmetic instruction. The control logic unit detects the effective data width of operation data to be processed according to the decode result from the instruction decoder and determines the number of cycles for the instruction execution corresponding to the effective, data width. The ALU executes the instruction with the number of cycles of the instruction execution determined by the control logic unit.

4 Claims, 10 Drawing Sheets

(56) References Cited

U.S. PATENT DOCUMENTS

| | | | |
|---|---|---|---|
| 5,790,827 | A | 8/1998 | Leung |
| 5,881,259 | A | 3/1999 | Glass et al. |
| 5,923,862 | A | 7/1999 | Nguyen et al. |
| 5,948,096 | A | 9/1999 | Ginosar et al. |
| 6,061,781 | A * | 5/2000 | Jain et al. ............ 712/221 |
| 6,154,829 | A | 11/2000 | Mino et al. |
| 6,170,050 | B1 | 1/2001 | Koppala et al. |
| 6,173,305 | B1 | 1/2001 | Poland |
| 6,378,022 | B1 | 4/2002 | Moyer et al. |
| 6,490,669 | B1 | 12/2002 | Yabe |
| 6,496,924 | B2 | 12/2002 | Sakamoto |
| 6,560,624 | B1 | 5/2003 | Otani et al. |
| 6,622,234 | B1 | 9/2003 | Pechanek et al. |
| 7,000,135 | B2 | 2/2006 | Kaneko |
| 2001/0037445 | A1 | 11/2001 | Mukherjee |
| 2002/0103991 | A1 | 8/2002 | Overkamp et al. |

OTHER PUBLICATIONS

David A. Patterson et al., "Computer Organization & Design: The Hardware/Software Interface," Nikkei Business Publications, Inc., Apr. 19, 1996, pp. 190-199 (with translation).

John L. Hennessey et al., "Computer Architecture: A Quantitative Approach," Nikkei Business Publications, Inc., Feb. 18, 1994, pp. 626-631, 666-671 (with translation).

Motorola, MC68020 32-Bit Microprocessor User's Manual, 1985, Prentice-Hall Inc., 9 pages.

Motorola, MC88110 Second Generation RISC Microprocessor User's Manual, 1991, Motorola, 4 pages.

* cited by examiner

DATA PROCESSING DEVICE

CROSS REFERENCE TO RELATED APPLICATION

This application claims priority under 35 U.S.C. §120 to U.S. patent application Ser. No. 12/472,193, filed May 26, 2009, which claims priority under 35 U.S.C. §120 to U.S. patent application Ser. No. 11/878,737, filed Jul. 26, 2007, which claims priority under 35 U.S.C. §119 to U.S. patent application Ser. No. 10/654,927, filed Sep. 5, 2003. This application is based on Japanese patent application No. 2002-261881, the content of which is incorporated hereinto by reference.

BACKGROUND OF THE INVENTION

1. Field of the Invention

The present invention relates to a data processing device for executing arithmetic instructions such as division and remainder instructions, and in particular, relates to a data processing device for setting the number of cycles for the instruction according to an effective data width obtained from operation data during the execution of an arithmetic instruction, and then executing the operation process within the number of cycles obtained.

2. Description of the Related Art

A conventional data processing device handles an instruction code having a size field in which data size information is stored, and determines the number of cycles, such as a loop iteration number of the operation for division and remainder instructions, based on the data size information of a dividend stored in a size field S in the instruction code (For example, see Document 1).

Document 1: Japanese laid-open publication number: JP-2001-034472.

The conventional data processing device, as shown in Document 1, involves a drawback where it is necessary to set the size (or an effective data width) of the operation data to be processed in a size information field for the operation data in an instruction code before arithmetic been compiled. That is, in the conventional technique, in order to select the optimum cycle number for the execution of the instruction obtained by the effective data width of the operation data to be processed, it is necessary to determine the effective data width for each operation data in advance.

SUMMARY OF THE INVENTION

The present invention is made to overcome the above drawback of the conventional technique. It is therefore an object of the present invention to provide a data processing device having means for detecting an effective data width of operation data to be processed during the execution of an arithmetic instruction. Then, the data processing device can select the optimum cycle number based on the effective data width for each target arithmetic data during the execution of the operation instruction without setting any effective data width for each operation data in an instruction code in advance.

In accordance with an aspect of the present invention, there is provided a data processing device having an instruction decoder, a controller, and an operation unit. The instruction decoder decodes instruction codes for the arithmetic instruction. The controller detects the effective data width for the operation data to be processed in the execution of the arithmetic instruction based on the decode result transferred from the instruction decoder, and determines an instruction execution cycle number according to the effective data width. The operation unit executes the arithmetic instruction within the instruction execution cycle number determined by the controller

BRIEF DESCRIPTION OF THE DRAWINGS

Other objects, features and advantages of the present invention will become apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiments of the present invention.

First Embodiment

Figure 1:
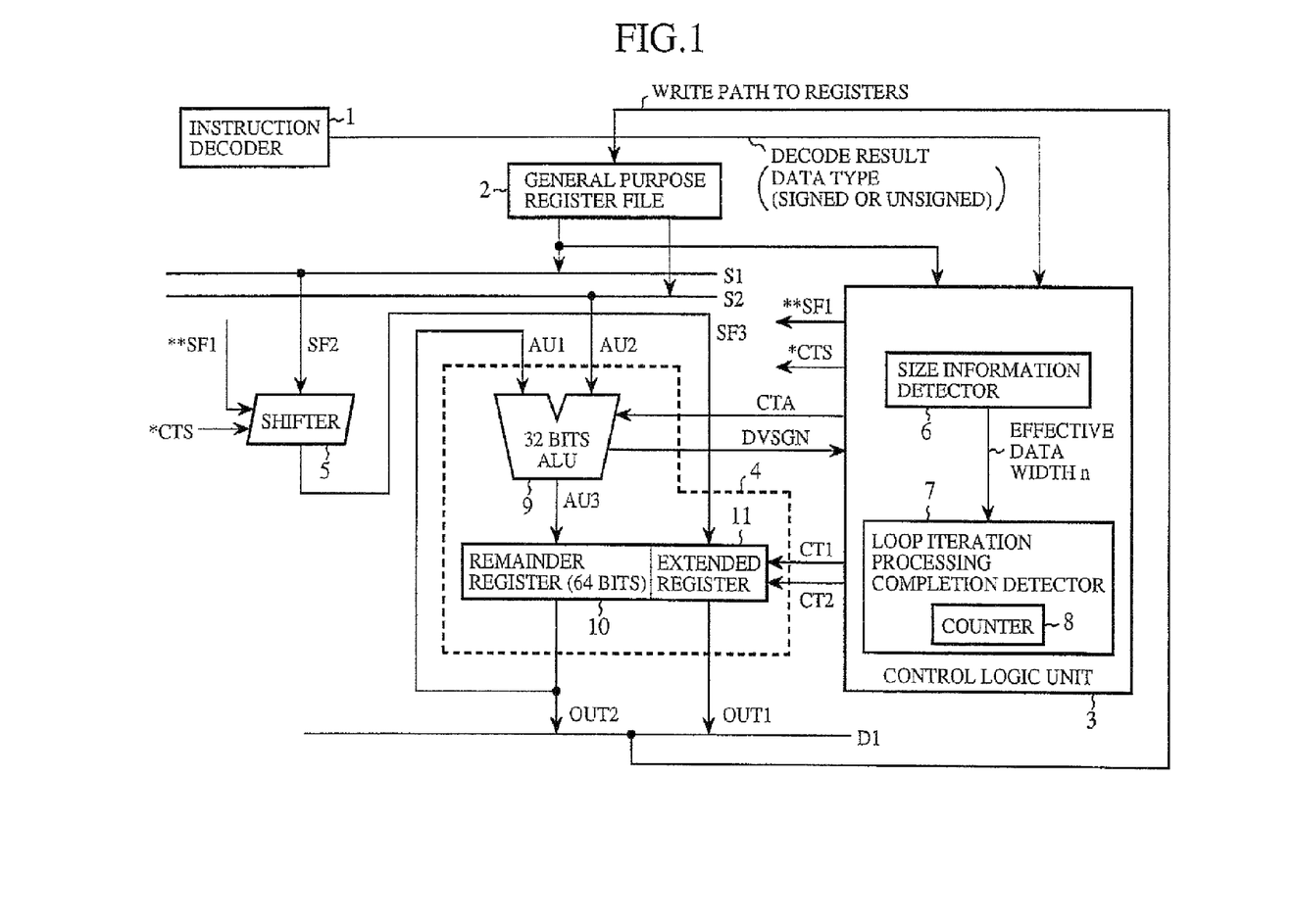
FIG. 1 is a block diagram showing a configuration of a data processing device according to a first embodiment of the present invention.

FIG. 1 is a block diagram showing a configuration of a data processing device according to a first embodiment of the present invention. FIG. 1 shows hardware to execute a division instruction, for example.

In the diagram, the instruction decoder 1 receives an instruction code to be processed, decodes the received one, and then transfers the decode result to the control logic unit 3. For example, the decode result provides various information such as the information to specify the type of the instruction (a division instruction, a remainder instruction, and so on), the information (or data type information) to specify the presence of a sign of the operation data, and control information (or instruction code information) for controlling the instruction cycle number to be used upon the determination of the instruction cycle number for the execution of the instruction. The general purpose register file 2 is made up of a register group having a plurality of registers. The operation data to be handled in the operation process are stored in the registers.

The control logic unit (forming a controller) 3 comprises a size information detector 6 and a loop iteration completion detector 7. The control logic unit 3 controls various operations during the execution of the division instruction and the remainder instruction.

An ALU (Arithmetic and Logical Unit) 4 comprises an ALU 9 and a remainder register 10. The ALU 9 inputs information to specify both arithmetic data items and the operation to be executed, and executes the specified operation with those data items. The remainder register 10 includes an extended register 11. The shifter 5 executes a shifting of the dividend data according to a control signal transferred form the control logic unit 3. In the example shown in FIG. 1, reference characters "*" and "**" are added to the control signals SF1 and CTS to be transferred from the control logic unit 3 to the shifter 5. Those characters "*" and "" indicate the connection relationship between the control logic unit 3 and the shifter 5. For example, reference character "" means to directly transfer the control signal SF1 from the control logic unit 3 to the shifter 5.

The size information detector (forming the controller) 6 detects the size information "n" (as the effective data width) of the dividend during the execution of division and remainder instructions and outputs the detected one as the effective data width to the loop iteration completion detector 7. This size information detector 6 comprises a priority encoder, for example. The loop iteration completion detector 7 in the control logic unit 3 detects the completion time of the loop-iteration for the division process based on the counted value in the counter 8 and the effective data width transferred from the size information detector 6. The counter 8 is incremented every completion of a loop iteration based on a nonrestoring division. The 64-bit remainder register 10 stores operation data generated by the division process performed by the ALU 9, and also has an extended register 11 for storing the dividend data shifted by the shifter 5.

Figure 2:
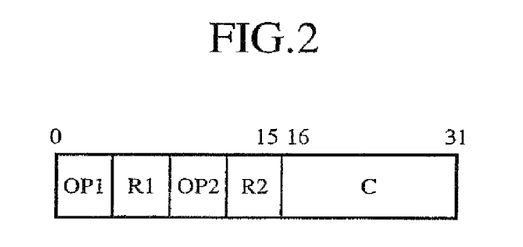
FIG. 2 is a diagram showing an instruction format for use in the data processing device shown in FIG. 1.

FIG. 2 is a diagram showing an instruction format to be handled by the data processing device shown in FIG. 1. FIG. 2 shows an instruction code of a division instruction and a remainder instruction, for example. In FIG. 2, information specifying the type (for example, a division instruction, a remainder instruction, and so on) of the operation instruction to be executed is stored in the first operand code (opcode) OP1 and second operand code (opcode) OP2. The type of data (as data type information) to be stored in registers specified by a destination register identifier R1 and a source register identifier R2 is defined in the opcode OP1 and the opcode OP2 as a part of the instruction. Here, the data type is the information to specify one of the signed operand (signed) and the unsigned operand (unsigned) for the process.

It is possible to place the information to specify the data type in a bit position other than the opcode of the instruction code. The information to specify the register storing a dividend in the register group in the general purpose register file 2 is stored in the destination register identifier R1. The information to specify the register storing a divisor in the register group in the general purpose register file 2 is stored into the source register identifier R2. Contrary to the conventional technique, the size information of the dividend data for the division and remainder instructions is not stored in a constant number field C in the instruction code.

Figure 3A:
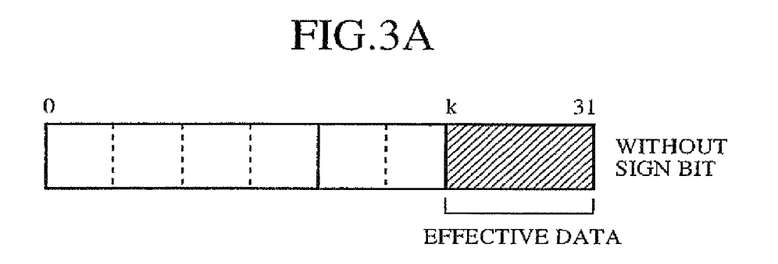
FIGS. 3A and 3B are diagrams showing data formats for use in the data processing device shown in FIG. 1.
Figure 3B:
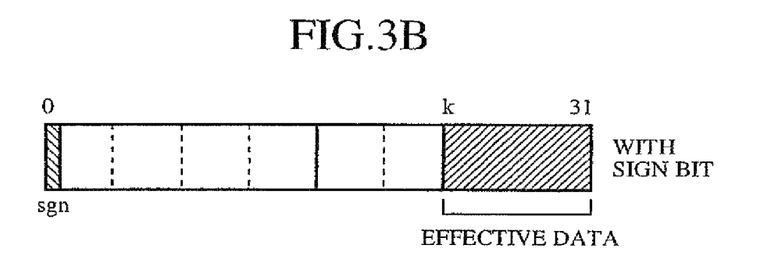

FIGS. 3A and 3B are diagrams showing data formats for use in the data processing device shown in FIG. 1. FIG. 3A shows the unsigned data format (without any sign bit) and FIG. 3B shows the signed data format (with a sign bit). In the unsigned data format shown in FIG. 3A, the first bit position of the logical value "1" searched from the most significant bit ("0" bit) is defined as $k^{th}$ bit. On the other hand, in the data format with a sign bit shown in FIG. 3B, the first bit position of the reversed logical value of the sign bit "sgn" searched from the first bit excepting the sign bit "sgn" is defined as $k^{th}$ bit. FIG. 3B shows the case where effective data are stored in the field of $k^{th}$ bit to $31^{th}$ bit in the 32 bit data format.

Next, a description will be given of the operation of the data processing device.

Figure 4:
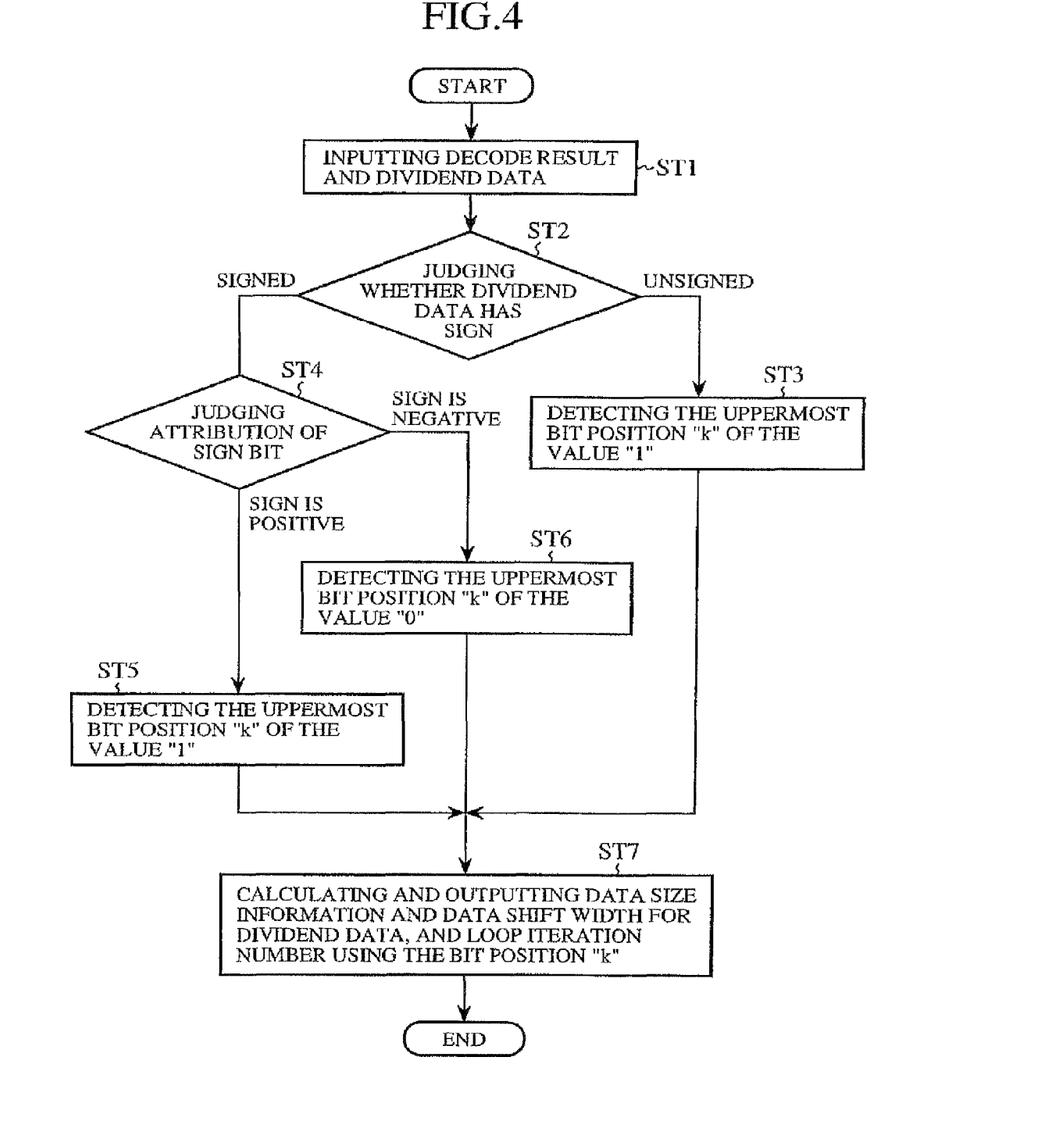
FIG. 4 is a flow chart showing operation for setting an instruction cycle number by the data processing device according to the first embodiment.

FIG. 4 is a flow chart showing the operation for setting the instruction number cycle by the data processing device according to the first embodiment. FIG. 4 shows a pre-processing for a division based on a nonrestoring division that will be described later. The detection process of the size information "n" (as the effective data width) of the dividend data in the division and remainder instructions will be explained according to the FIG. 4. For example, in the data processing device of a 32 bit date length, "n" becomes an integer satisfying the range of 0<n 32. Hereinafter, we assume that the data processing device handles the data of a 32 bit length.

First, when receiving an instruction code generated by the compilation of a source code, the instruction decoder 1 decodes the instruction code received. The instruction written in the source code is arranged in the hardware in the data processing device for operation. At this time, the kind of the instruction (for example, division and remainder instructions) and the data type of the operand to be processed, which are set in the first opcode OP1 and the second opcode OP2 in the instruction code, are retrieved as the instruction code information.

The instruction decoder 1 transfers the instruction code information as the decode result to the control logic unit 3. The size information detector 6 in the control logic unit 3 inputs the decode result. After this, the data processing device of the first embodiment starts the execution of the division instruction.

Next, the control logic unit 3 reads the dividend data stored in the register in the general purpose register file 2 based on the information set in the destination register identifier R1 and transfers it onto the bus Si and also transfers it to the size information detector 6 (Step ST1).

The size information detector 6 judges whether the dividend data has a sign bit or not based on the data type of the dividend data retrieved from the instruction code information as the decode result (Step ST2). When the dividend data has no sign bit, the size information detector 6 detects the most bit position "k" (as the kth bit) of the logical value "1" that is firstly detected while searching it from $O^{th}$ bit as the most significant bit (Step ST3). When does not detect any logical value "1", the detector 6 judges that the dividend data is zero.

On the other hand, when the dividend data is signed data, the size information detector 6 judges whether the sign is a positive or negative value (Step ST4). When the sign is a positive value, that is, when the sign bit as the 0 bit in the dividend data is the logical value "0", the detector 6 detects the first bit position "k" where the revprsed value "1" of this sign bit "0" is firstly detected (Step ST5). On the contrary, when the sign is a negative value, that is, when the sign bit as the $O^{th}$ bit in the dividend data is the logical value "1", the detector 6 detects the bit position "k" where the reversed value "0" of this sign bit "1" is firstly detected (Step ST6).

After the detection of the bit position "k" by the manner previously described, the detector 6 calculates (32−k) bit data by subtracting k from the 32 bit data length, handled by the data processing device of the first embodiment. The size information detector 6 transfers the calculation result, namely, the data size information "n" of the dividend data as the effective data width to the loop iteration completion detector 7. In addition, the size information detector 6 determines that the magnitude of the shifting is k, and generates the control signal SF1 to specify the shift width k and outputs it onto the bus S2 because the data of the $0^{th}$ bit to $(k-1)^{th}$ bit is un-effective data for calculation (Step ST7).

Next, a description will now be given of the division process based on nonrestoring division.

Figure 5:
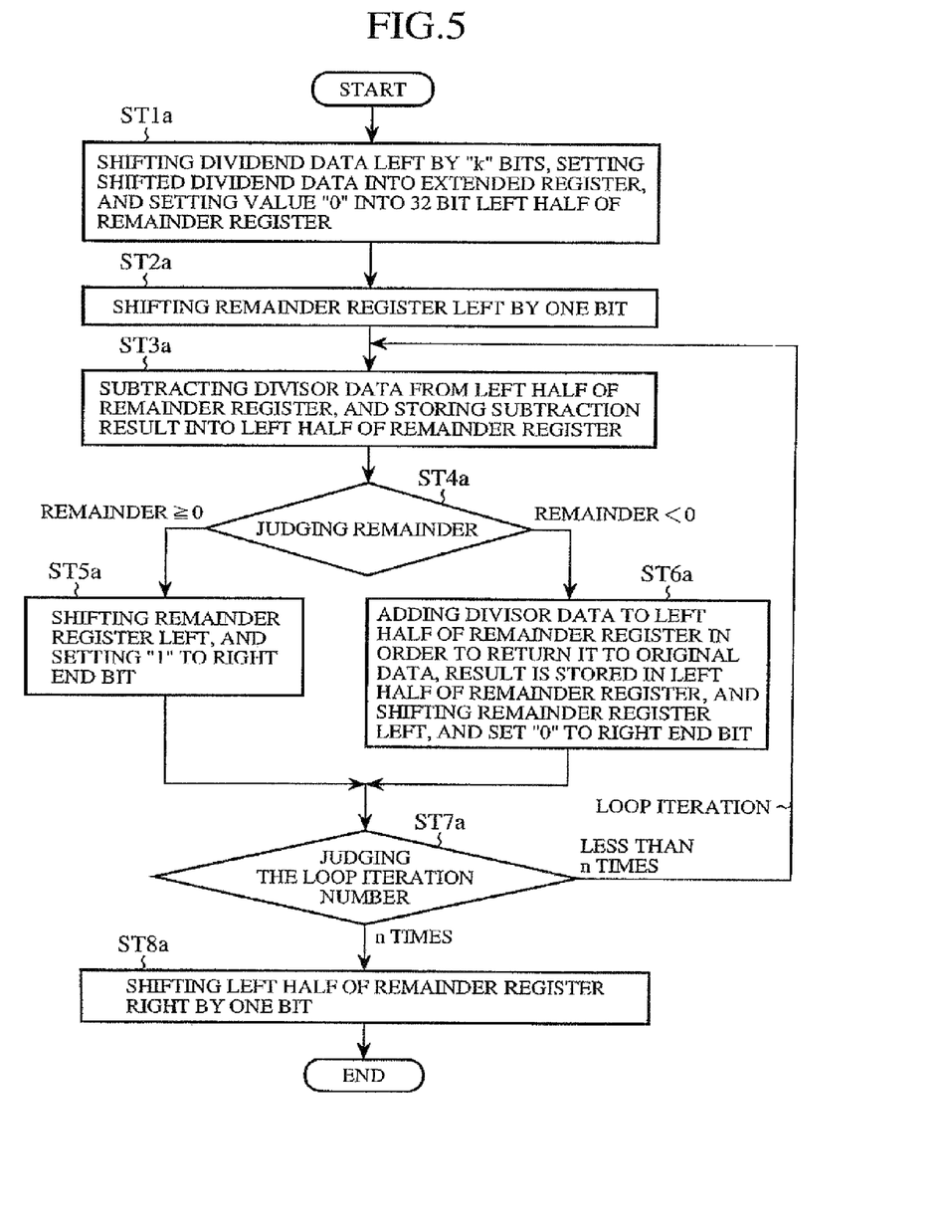
FIG. 5 is a flow chart showing an operation of a division instruction executed by the data processing device.

FIG. 5 is a flow chart showing the operation for a division instruction executed by the data processing device. The algorithm of the execution of the division instruction based on nonrestoring division will be explained with reference to FIG. 5.

Firstly, the shifter 5 inputs the shift width k and the dividend data, where the shift width k is specified by the control signal SF1 transferred from the control logic unit 3 and the dividend data is obtained under the control of the control logic unit 3. The shifter 5 receives the control signal CTS transferred from the control logic unit 3. This control signal CTS indicates that the shifting direction is left. The shifter 5 shifts the position in the dividend data left by the shift width k. As shown in FIGS. 3A and 3B, the data items of $0^{th}$ bit (including the sign bit) to (k-1) bit in the dividend data is out of operation, namely, those are not effective data items. Accordingly, by shifting the dividend data left by the shift width k, it is possible to eliminate the unnecessary data items from the dividend data.

The shift result by the shifter 5 is stored in the extended register 11 in the remainder register 10 through the path SF3. The value "zero" is stored into the 32 bit left half of the remainder register 10. Step ST1a includes from the process where the shifter 5 obtains the shift width and the dividend data transferred from the control logic unit 3 to the process where the value "zero" is stored in the 32 bit left half of the remainder register 10.

Next, the control logic unit 3 outputs the control signals CT1 and CT2 to the remainder register 10 in order to shift the data left by one bit, which is stored in the remainder register 10 (Step ST2a). The control signal CT1 is a signal to control the shifting direction of the data in the remainder register 10, like the conventional one. The control signal CT2 is a signal to specify data to be stored into the LSB (Least Significant Bit) of the remainder register 10.

Following the process, the loop iteration completion detector 7 sets the initial value "zero" to the counter 8. Thereby, the loop iteration of the division is initiated based on nonrestoring division.

First, the ALU 4 reads the divisor data stored in the general purpose register file S2 on the internal bus 2 under the control of the control logic unit 3 based on the information set in the source register identifier R2, and transfers the divisor data to the ALU 9 through the path AU2. Further, the ALU 9 gets the 32 bit left half data of the remainder register 10 through the path AU1. When receiving the control signal CTA generated by and transferred from the control logic unit 3, the ALU 9 starts the subtraction process where the divisor on the path AU2 from the data on the path AU1. The ALU 9 stores the subtraction result into the 32 bit left half of the remainder register 10 (Step ST3a).

When the subtraction process is executed, the control logic 3 judges whether the remainder is not less than zero or not (Step ST4a). In a concrete example, like the conventional technique, the control logic unit 3 retrieves the MSB (Most Significant Bit) in the operation result in the ALU 9 as the control signal DVSGN. At this time, because the remainder becomes not less than zero when the control signal DVSGN is zero, the control logic unit 3 outputs the control signal CT1 to indicate "Shifting left by one bit" to the ALU 4 in order to shift the data in the remainder register 10 left by one bit. The control logic unit 3 sets the value "1" to the LSB (Least Significant Bit) in the remainder register 10 (Step ST5a). That is, when the data in the remainder register 10 is shifted left by one bit, the value "1" is set to the most significant right-hand bit.

On the other hand, because the remainder is less than zero when the control signal DVSGN is the value "1", the control logic unit 3 transfers the divisor data on the internal bus 52 to the ALU 9. Further, the left half data of the remainder register 10 is set in the AU 1. After this process, the ALU 9 adds the data on the path AU1 and the data on the path AU2, and then stores the operation result of the addition into the 32 bit left half of the remainder register 10. That is, the divisor data in the general purpose register file 2 is added to the left half of the remainder register 10. The data in the remainder register 10 is replaced with the original data before the execution of the subtraction process previously described.

Next, the control logic unit 3 outputs the control signal CT1 to indicate "Shifting left by one bit" to the ALU 4 in order to shift the data in the remainder register 10 left by one bit. Following this, the control logic unit 3 outputs the control signal CT2 of zero (CT2=0) to the remainder register 10 in order to set the value "zero" to the LSB in the remainder register 10. That is, the data in the remainder register 10 is shifted left by one bit and the value "zero" is set to the most significant right bit in the remainder register 10 (Step ST6a).

Following this process, the control logic unit 3 judges the number of the loop-iterations (Step ST7a). In a concrete example, the loop iteration completion detector 7 increments the value of the counter 8 by one every the execution of the loop iteration for the subtraction based on nonrestoring division.

After this, the loop iteration completion detector 7 compares the size information "n" of the dividend data, stored as the completion number for the loop iteration based on nonrestoring division, with the value of the counter 8. When the value of the counter 8 is less than "n", that is, when the number of the loop-iteration processes is less than "n", the processes previously described is repeated again.

On the other hand, when the value of the counter 8 is "n", that is, when the number of the loop-iteration processes is reached to the value "n", the control logic unit 3 outputs the control signal to indicate "Shifting right by one bit" to the ALU 4 in order to shift the data in the remainder register 10 right by one bit (Step ST8a).

Upon executing a division instruction, the control logic unit 3 outputs the data (quotient) stored in the extended register 11 to the internal bus D1 through the path OUT1. When a remainder instruction is executed, the control logic unit 3 outputs data (remainder) stored in the upper 32 bit of the remainder register 10 to the internal bus D1 through the path OUT2. Finally, the operation result of the data processing device is transferred to and stored in the register (specified by the destination register identifier in the instruction code) in the general purpose register file 2 through the internal bus D1.

As described above, because the data processing device according to the first embodiment has the size, information detector 6 to directly detect the size information of the dividend data from the dividend data itself during the execution of the division instruction, it is possible to select the optimum number of cycles for each dividend data during the execution of the division instruction.

Second Embodiment

Figure 6:
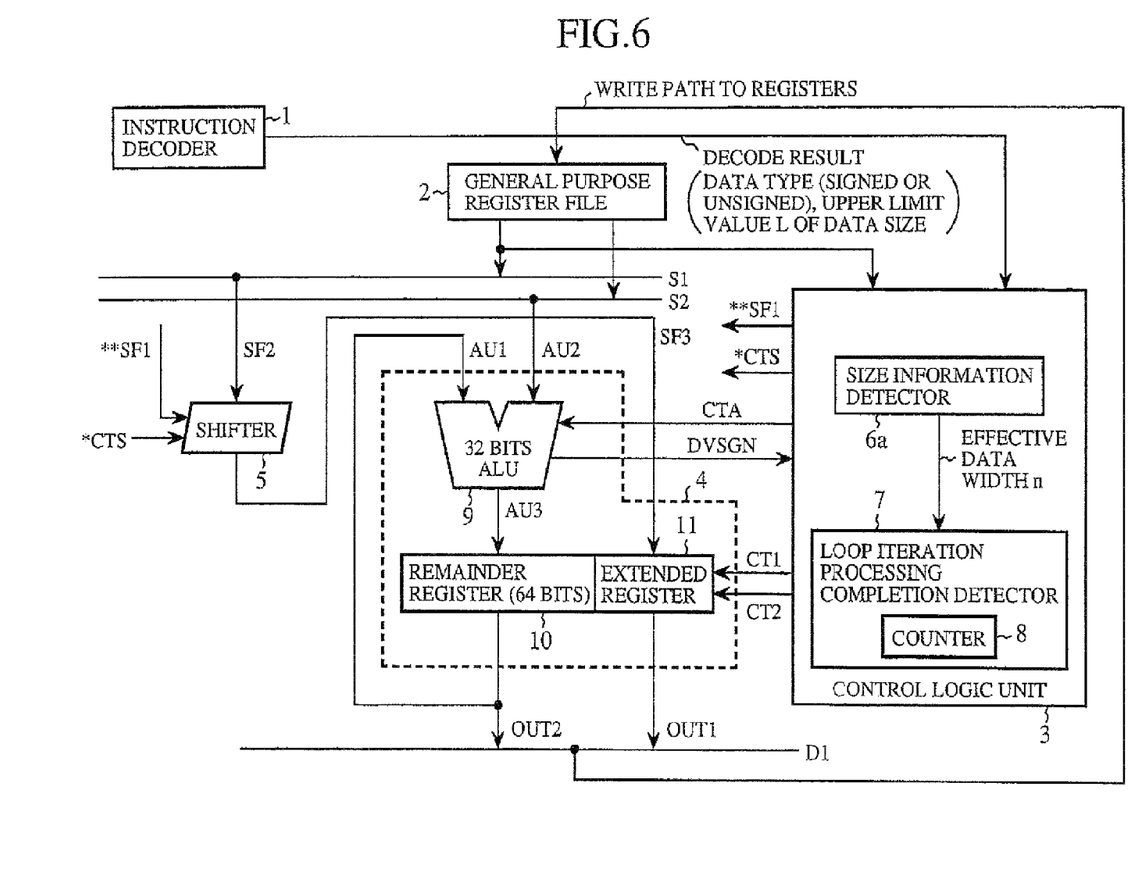
FIG. 6 is a block diagram showing a configuration of a data processing device according to a second embodiment of the present invention.

FIG. 6 is a block diagram showing a configuration of a data processing device according to a second embodiment of the present invention. FIG. 6 shows hardware to execute a division process, for example. In the diagram, the size information detector 6a (forming the controller) detects the size information (effective data width) of a dividend data during the execution of division and remainder instructions based on the decode result of the dividend data including the size upper-limit value L transferred from the instruction decoder, and outputs the detected one to the loop iteration completion detector 7. This size information detector 6a comprises a priority encoder which searches only the L bit width data based on the size upperlimit value L. The same components in the data processing device of the first embodiment will be referred to with the same reference numbers, and the explanation for the same components is omitted here for brevity.

Figure 7:
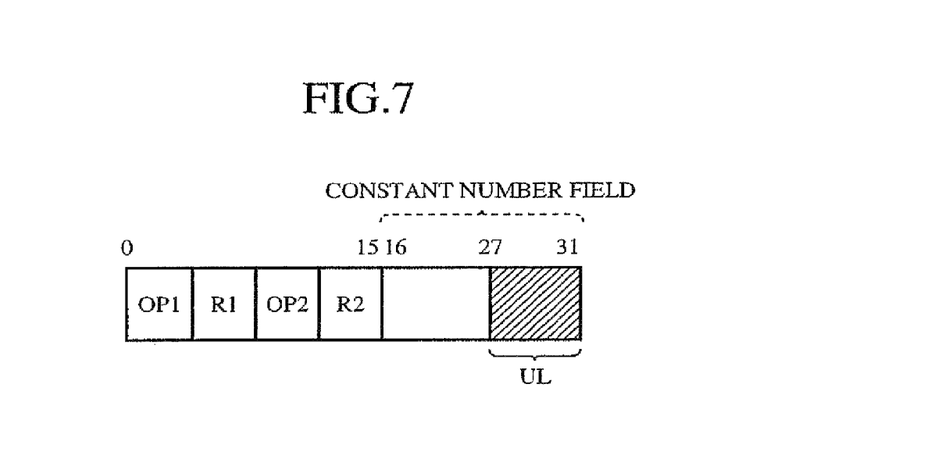
FIG. 7 is a diagram showing an instruction format for use in the data processing device shown in FIG. 6.

FIG. 7 is a diagram showing an instruction format for use in the data processing device shown in FIG. 6. In the diagram, the information to specify the type (for example, a division instruction and a remainder instruction) of the instruction to be executed is stored in the first and second opcodes OP1 and OP2.

The type of data (as data type information) to be stored in registers specified by the destination register identifier Ri and the source register identifier R2 is defined in the opcode OP1 and the opcode OP2 as a part of the instruction. Here, like the first embodiment, the data type is the information to specify one of the signed operand (with sign) and the unsigned operand (without sign) for the process.

It is possible to place the information to specify the data type in a bit position other than the opcode of the instruction code. The information to specify the register storing a dividend in the register group in the general purpose register file 2 is stored in the destination register identifier R1. The information to specify the register storing a divisor in the register group in the general purpose register file 2 is stored into the source register identifier R2.

The information to specify the size upper-limit value L of the dividend data is stored in a size field UL (size upper-limit information) placed in a part in the constant field C in the instruction code. For example, in the data processing device handling 32 bit data, the size upper-limit value L takes within the range O<L≤32.

Figure 8A:
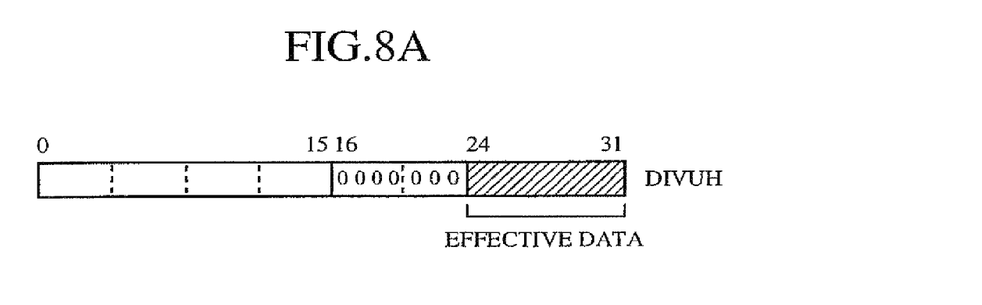
FIGS. 8A and 8B are diagrams showing data formats for use in the data processing device shown in FIG. 6.
Figure 8B:
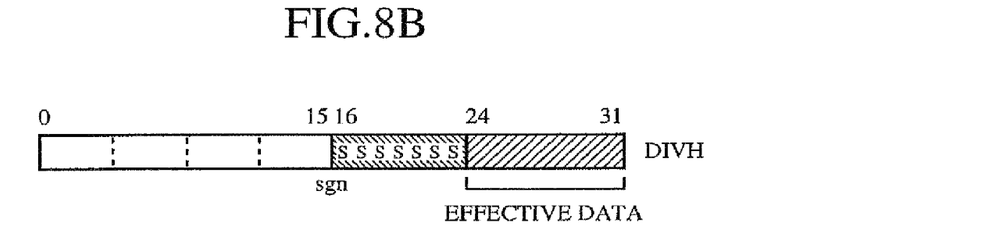

FIGS. 8A and 8B are diagrams showing data formats, each having the size upper-limit value of 16 bits for use in the data processing device shown in FIG. 6. In particular, FIG. 8A shows the unsigned data format (without sign) and FIG. 8B shows the signed data format (with sign). In FIGS. 8A and 8B, DIVUH and DIVH are mnemonics for a division instruction. The former is the unsigned division instruction and the latter is the signed division instruction. Because the size upper-limit value L of the dividend data is 16-bit long, the data processing device processes the value from the $O^{th}$ bit to $15^{th}$ bit as invalid data in the data formats corresponding to the mnemonics DIVUH and DIVH.

Next, a description will be given of the operation of the data processing device.

Figure 9:
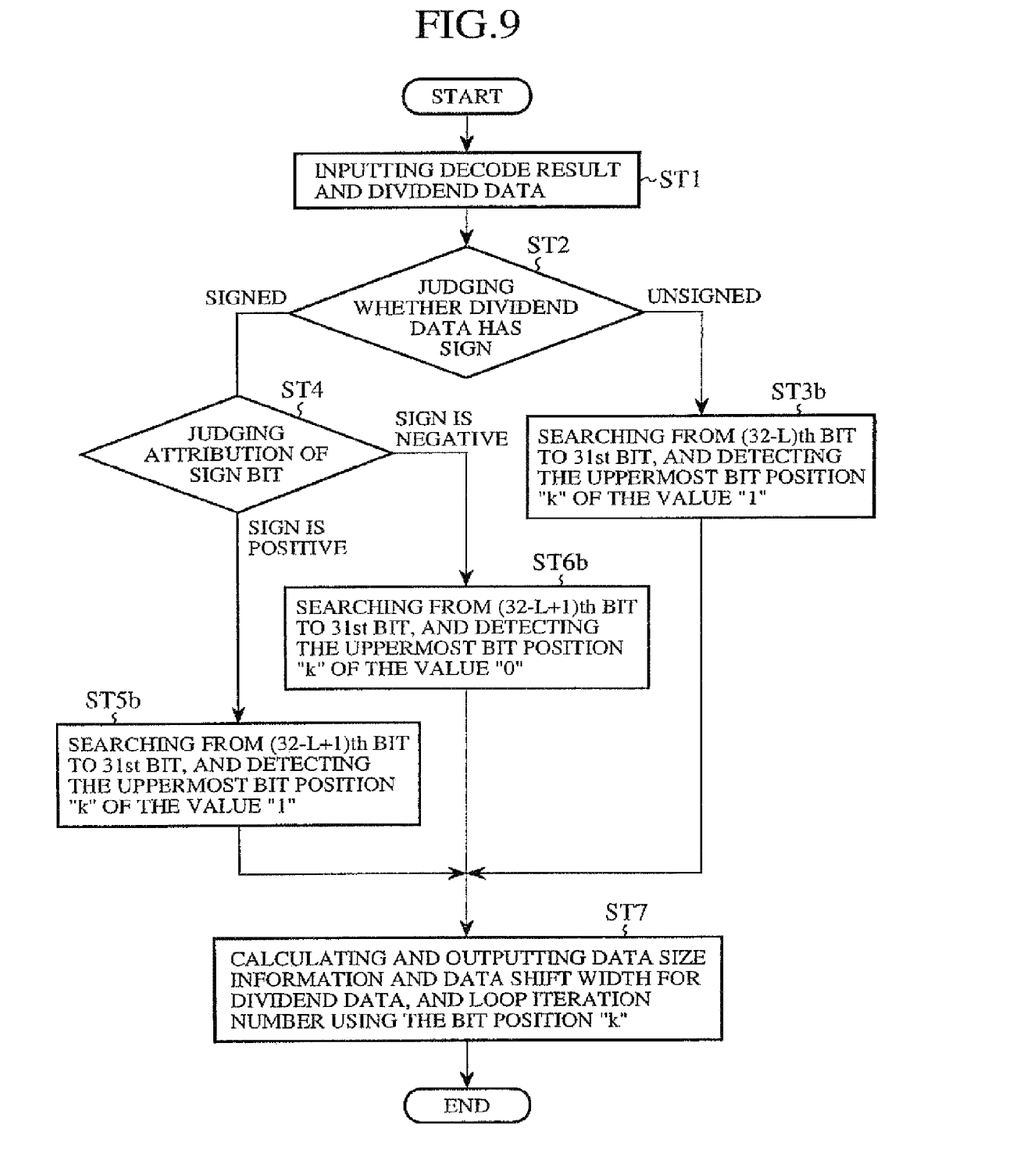
FIG. 9 is a flow chart showing operation for setting the number of cycles for the instruction by the data processing device according to the second embodiment.

FIG. 9 is a flow chart showing the operation for setting the number of cycles for the instruction by the data processing device according to the second embodiment.

This process shown in FIG. 9 corresponds to the preprocessing of the division based on nonrestoring division that will be described in detail.

The detection process of the size information "n" of the dividend data in the division and remainder instructions will be explained according to the FIG. 4. For example, in the data processing device handling a 32 bit data length, "n" becomes an integer satisfying the range of 0<n≤32. Hereinafter, we assume that the data processing device handles data of a 32 bit data length.

First, when receiving an instruction code generated by the compilation of a source code, the instruction decoder 1 decodes the instruction code received. The instruction written in the source code is arranged in the hardware in the data processing device for operation. At this time, the kind of the instruction (for example, a division instruction and a remainder instruction) and the data type of the operand to be processed, which are set in the first opcode OP1 and the second opcode OP2 in the instruction code, are retrieved as the instruction code information.

The instruction decoder 1 transfers the instruction code information as the decode result to the control logic unit 3. The size information detector 6a in the control logic unit 3 inputs the decode result. After this, the data processing device of the second embodiment starts the execution of the division instruction.

Next, the control logic unit 3 reads the dividend data stored in the register in the general purpose register file 2 based on the information set in the destination register identifier R1 in the decode result and transfers it onto the bus S1 and also transfers it to the size information detector 6a (Step ST1).

The size information detector 6a judges whether the dividend data has a sign bit or not based on the data type of the dividend data retrieved from the instruction code information as the decode result (Step ST2). When the dividend data has no sign bit (unsigned data), the size information detector 6a detects the first bit position "k" (as $k^{th}$ bit) of the logical value "1" that is firstly detected while searching from $(32-L)^{th}$ bit to $31^{st}$ bit other than the $O^{th}$ bit (most significant bit) to $(31-L)^{th}$ bit in the dividend data. The detector 6a treats the range of $O^{th}$ bit to $(31-L)^{th}$ bit in the dividend data as invalid data items (Step ST3b). When does not detect any logical value "1", the detector 6a judges that the dividend data is zero.

On the other hand, when the dividend data is signed data, the size information detector 6a judges whether the sign is a positive or negative value (Step ST4). Here, when the upper-limit value of the dividend data is L and the sign is a positive value, that is, when the value of the $(32-L)^{th}$ sign bit in the dividend data is a logical value "0", the detector 6a searches from the $(32-L+1)^{th}$ bit to $31^{st}$ bit in order to detect the first bit position "k" of the reversed value (namely, the logical value "1") of the logical value "0" (Step ST5b).

On the contrary, when the sign is a negative value, that is, when the value of the $(32-L)^{th}$ sign bit in the dividend data is a logical value "1", the detector 6a searches from the $(32-L+1)^{th}$ bit to $31^{st}$ bit in order to detect the first bit position "k" of the reversed value (namely, the logical value "0") of the logical value "1" (Step ST5b). In the example shown in FIG. 8B, the bit values from $16^{th}$ bit position to $23^{rd}$ bit position take the same value "S" of the sign bit (which is $16^{th}$ bit position as the logical value S). Therefore the effective data is from $24^{th}$ bit position to $31^{st}$ bit position.

After the detection of the bit position "k" by the manner previously described, the detector 6a calculates (32-k) value as the data size information "n" of the dividend data and the number of cycles for the loop iteration by subtracting k from the 32 bit data length, handled by the data processing device of the second embodiment.

The size information detector 6a transfers the calculation result, namely, the data size information "n" of the dividend data as the effective data width to the loop iteration completion detector 7.

In addition, the size information detector 6a determines that the magnitude of the shifting of the dividend data is k, and generates the control signal SF1 to specify the shift width k and outputs it onto the bus S2 because the data of the $0^{th}$ bit (including the sign bit) to $(k-1)^{th}$ bit is un-effective data for calculation (Step ST7).

Because the division process based on nonrestoring division after the process described above is the same of that in the first embodiment, the explanation is therefore omitted here.

As described above, according to the data processing device of the second embodiment, because the upper-limit value L to be used for the determination of the searching range to detect the size information of the dividend data is set in the instruction code, it is possible to perform the detection process of the size information of the dividend data at high speed. In addition, it is not necessary to correct the dividend data in a 32 bit data format when it is stored because the data items of the bit positions out of the range specified by the size upper-limit value L become invalid data.

Third Embodiment

Figure 10:
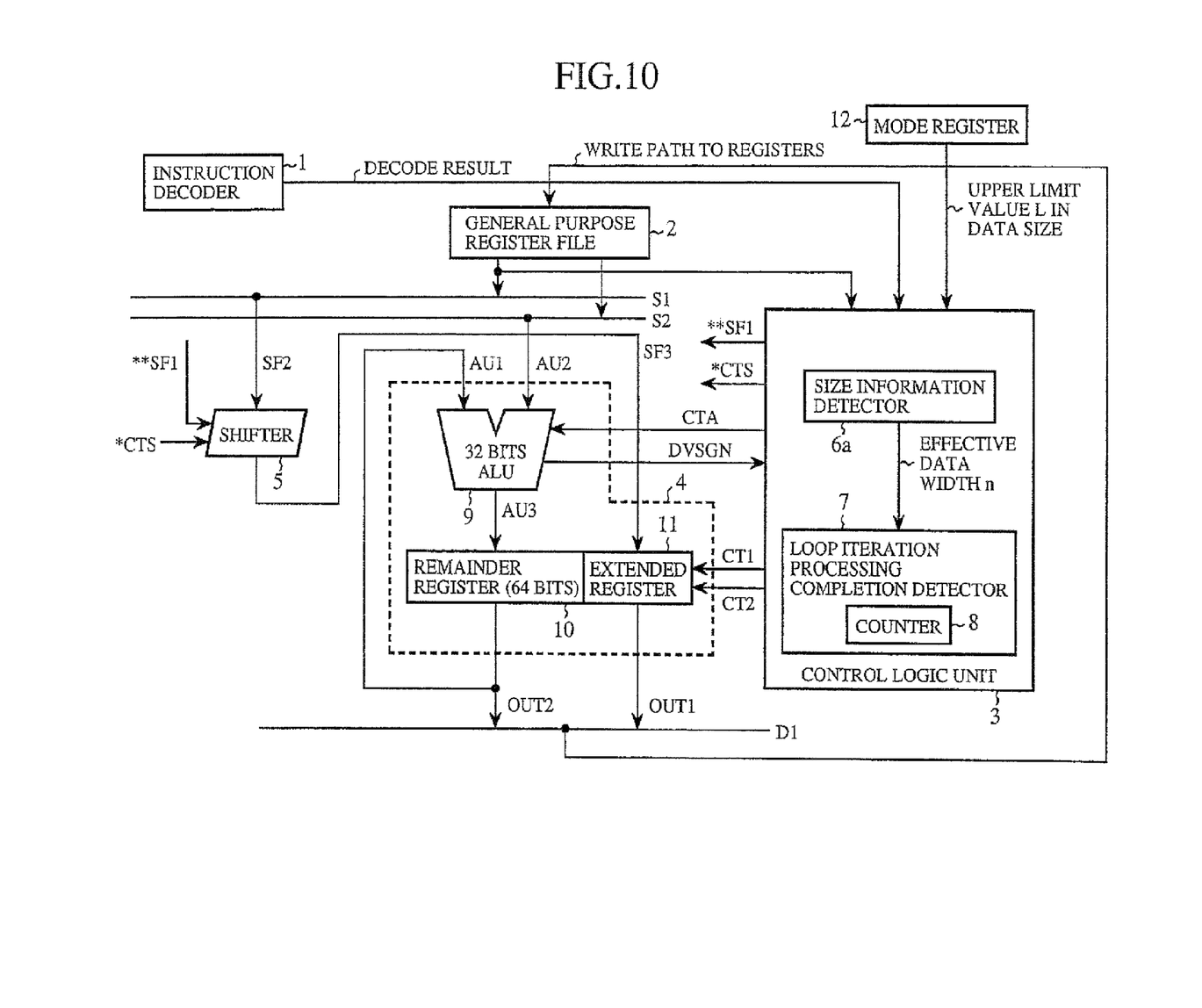
FIG. 10 is a block diagram showing a configuration of a data processing device according to a third embodiment of the present invention.

FIG. 10 is a block diagram showing a configuration of a data processing device according to a third embodiment of the present invention. FIG. 10 shows hardware to execute a division process, for example. In the diagram, the mode register (as a memory) 12 stores the information (as data type information) to specify the data type of dividend data and the size upper-limit value L (as a size upper-limit value) of the dividend data.

The same components in the data processing device shown in FIG. 1 and FIG. 6 will be referred to with the same reference numbers, and the explanation for the same components is omitted here for brevity.

First, the data processing device of the third embodiment uses the same instruction formats of the first embodiment shown in FIGS. 3A and 3B. That is, no size information of dividend data for division and remainder instructions is stored in the constant field C in the instruction code. The data processing device of the third embodiment uses the same data format of the second embodiment shown in FIGS. 8A and 8B. The data items of the bit positions out of the range specified by the size upperlimit value L become invalid.

Next, a description will now be given of the operation of the third embodiment.

The detection process of the size information "n" of a dividend data on the execution of division and remainder instructions will be explained. For example, in the data processing device using 32 bit data, the size information "n" becomes an integer satisfying the range $0<n\le32$. Hereinafter, we assume that the data processing device handles data of 32 bit data length.

First, when receiving an instruction code generated by the compilation of a source code, the instruction decoder 1 decodes the instruction code received. The instruction written in the source code is arranged in the hardware in the data processing device. At this time, the kind of the instruction (for example, division and remainder instructions) and the data type of the operand to be processed, which are set in the first opcode OP1 and the second opcode OP2 in the instruction code, are retrieved as the instruction code information.

The instruction decoder 1 transfers the instruction code information as the decode result to the control logic unit 3. The size information detector 6a in the control logic unit 3 inputs the decode result.

Next, the control logic unit 3 reads the dividend data stored in the register in the general purpose register file and transfers it onto the bus Si and also transfers it to the size information detector Ga. Further, the control logic unit 3 reads the data type and the size upper-limit value L, corresponding to the dividend data, stored in the mode register 12 and transfers those data to the size information detector 6a. The data processing device of the third embodiment thereby starts to execute the division instruction.

The size information detector 6a judges whether the dividend data has a sign bit or not based on the data type of the dividend data retrieved from the mode register 12. When the dividend data has no sign bit (unsigned data), the size information detector 6a detects the first bit position "k" (as $k^{th}$ bit) of the logical value "1" that is firstly detected while searching from $(32-L)^{th}$ bit to $31^{th}$ bit other than the $0^{th}$ bit (most significant bit) to $(31-L)^{th}$ bit in the dividend data. The detector 6a treats the range of 0th bit to $(31-L)^{th}$ bit in the dividend data as invalid data items.

On the other hand, when the dividend data is signed data, the size information detector 6a judges whether the sign is a positive or negative value. Here, when the upperlimit value of the dividend data is L and the sign is a positive value, that is, when the value of the $(32-L)^{th}$ sign bit in the dividend data is a logical value "0", the detector 6a searches from the $(32-L+1)^{th}$ bit to $31^{st}$ bit in order to detect the first bit position "k" of the reversed value (namely, the logical value "1") of the logical value "0".

On the contrary, when the sign is a negative value, that is, when the value of the $(32-L)^{th}$ sign bit in the dividend data is a logical value "1", the detector 6a searches from the $(32-L+1)^{th}$ bit to $31^{st}$ bit in order to detect the first bit position "k" of the reversed value (namely, the logical value "0") of the logical value "1".

After the detection of the bit position "k" by the manner previously described, the size information detector 6a calculates $(32-k)$ value as the data size information "n" of the dividend data and the number of cycles for the loop iteration by subtracting k from the 32 bit data length, handled by the data processing device of the second embodiment.

The size information detector 6a transfers the calculation result, namely, the data size information "n" of the dividend data as the effective data width to loop iteration completion detector 7.

In addition, the size information detector 6a determines that the magnitude of the shifting of the dividend data is k, and generates the control signal SF1 to specify the shift width k and outputs it onto the bus S2 because the data of the $0^{th}$ bit (including the sign bit) to $(k-1)^{th}$ bit is un-effective data for calculation (Step ST7).

Because the division process based on nonrestoring division after the process described above is the same of that in the second embodiment, the explanation is therefore omitted here.

As described above, according to the data processing device of the third embodiment, because the data processing device incorporates the mode register 12 into which the data type and the size upper-limit value L for dividend data are stored, it is possible to obtain the same effect of the second embodiment without any size information field in the instruction format.

The first through third embodiments have explained the hardware and arithmetic operation for the division process. The present invention is not limited by those cases, that is, the present invention can apply arithmetic processes of various types unless the instruction cycle number is determined based on the effective data width of operation. For example, it is possible to control the lower-limit of the number of cycles for the instruction execution and to control the lower-limit value of the operation result by setting the size lower-limit value of the arithmetic data other than the size upper-limit value thereof as the instruction code information.

Fourth Embodiment

Figure 11:
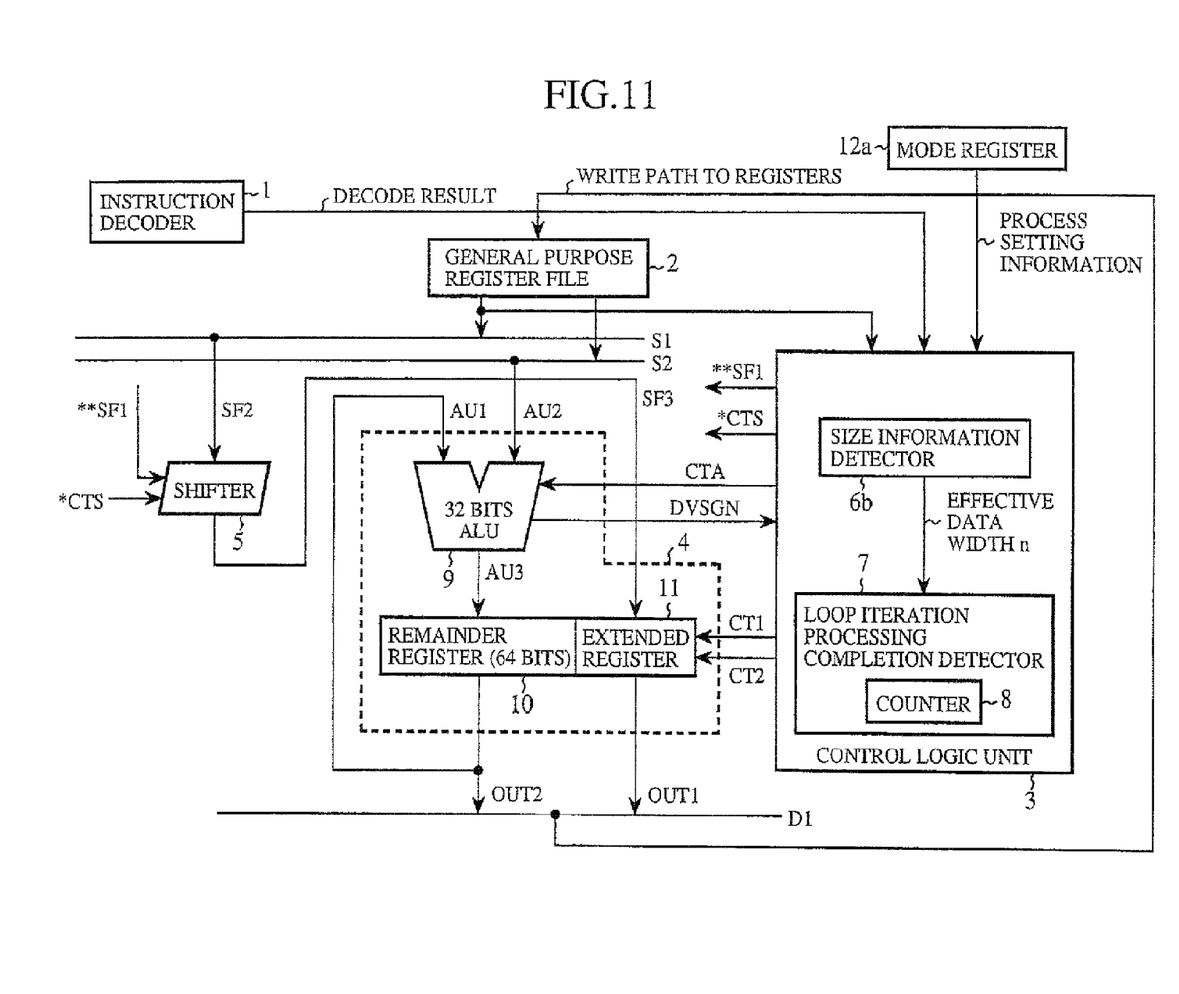
FIG. 11 is a block diagram showing a configuration of a data processing device according to a fourth embodiment of the present invention.

FIG. 11 is a block diagram showing a configuration of a data processing device according to a fourth embodiment of the present invention. FIG. 11 shows hardware to execute a division process, for example. In the diagram, the mode register (as a memory) 12a stores process setting information to specify whether or not the size information detector 6b performs the detection process of the effective data width of a dividend data. The same components in the data processing device shown in FIG. 1 and FIG. 6 will be referred to with the same reference numbers, and the explanation for the same components is omitted here for brevity.

The data processing device of the fourth embodiment performs the process to determine and set the instruction cycle number which has already been shown in the first embodiment. Further, the data processing device of the fourth embodiment selects the processes of the second and third embodiments previously described based on the process setting information stored in the mode register 12a and determines the instruction cycle number based on a data width which is determined in advance and stored in the mode register 12a.

Next, a description will now be given of the operation of the fourth embodiment.

The detection process of the size information "n" of a dividend data on the execution of division and remainder instructions will be explained. For example, in the data processing device using 32 bit data, the size information "n" becomes an integer satisfying the range $0 < n \leq 32$. Hereinafter, we assume that the data processing device handles data of 32 bit data length.

First, when receiving an instruction code generated by the compilation of a source code, the instruction decoder 1 decodes the instruction code received. The instruction described in the source code is arranged in the hardware in the data processing device for operation. At this time, the kind of the instruction (for example, division and remainder instructions) and the data type of the operand to be processed, which are set in the first opcode OP1 and the second opcode OP2 in the instruction code, are retrieved as the instruction code information.

The instruction decoder 1 transfers the instruction code information as the decode result to the control logic unit 3. The size information detector 6b in the control logic unit 3 inputs the decode result. Next, the control logic unit 3 reads the dividend data stored in the register in the general purpose register file and transfers it onto the bus Si and also transfers it to the size information detector 6b.

At this time, the size information detector 6b in the control logic unit 3 inputs the process setting information stored in the mode register 12a and then judges whether or not the detection function is valid or invalid, namely, whether or not the detection process of the effective data width of the dividend data is performed based on the process setting information inputted. In a concrete example, the mode register 12a stores the digital value to specify whether the detection function for the effective data width of the dividend data by the size information detector 6b is effective or ineffective. The size information detector 6b judges the effective or ineffective of the detection function based on the value of the process setting information.

When the detection function is effective, the detector 6b calculates the effective data width "n" of the dividend data corresponding to the number of cycles for the instruction execution of the division instruction by performing the same manner of the first embodiment prescribed. The processes following after the effective data width "n" is set into the loop iteration completion unit 7 are the same of those of the first embodiment.

On the contrary, when the process setting information indicates that the detection function for the effective data width of the dividend data is invalid, the detector 6b sets the 32 bit data for a processor of the data processing device into the loop iteration detector 7 as the effective data width "n" without detecting any effective data width "n". After this process described above, the fourth embodiment performs the same processes of the first embodiment, that is, the feature of the fourth embodiment can be applied to the first embodiment.

Figure 12:
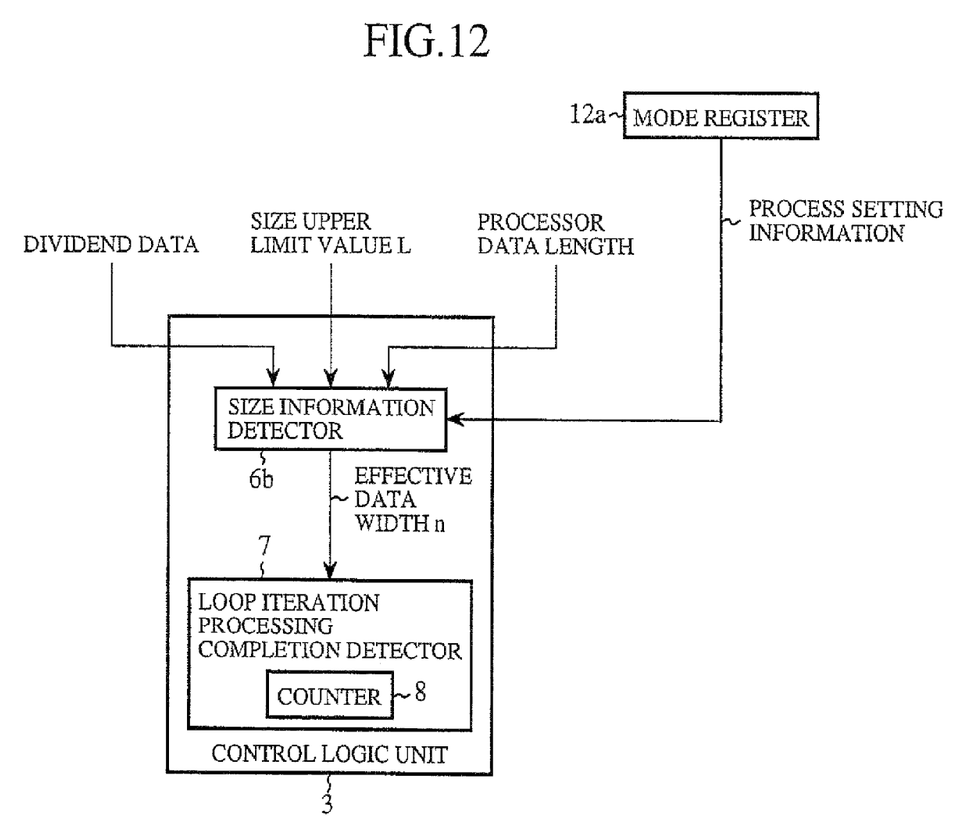
FIG. 12 is a block diagram showing a control logic unit and various data items to be inputted to the control logic unit.

FIG. 12 is a block diagram showing a control logic unit and peripherals.

With reference to FIG. 12, it will be explained that the feature of the fourth embodiment is applied to the cases of the first to third embodiments.

As shown in FIG. 12, when the configuration of the fourth embodiment is applied to the cases of the second and third embodiments, the size information detector 6b inputs the size upper-limit value L of the dividend data based on the decode result of the instruction code or from the mode register 12. The size upper-limit value L of the dividend data can be stored with the process setting information into the mode register 12a.

When the process setting information indicates that the detection function for the effective data width of the dividend data is valid, the size information-detector 6b performs the same processes of the second or third embodiment in order to calculate the effective data width "n" of the dividend data corresponding to the number of the instruction execution cycles for the division process. The processes following to the setting process to set the effective data width "n" to the loop iteration completion detector 7 are the same processes of the second or third embodiment.

On the contrary, when the process setting information indicates that the detection function for the effective data width of the dividend data is invalid, the size information detector 6b sets to the loop iteration completion detector 7 the size upper-limit value L of the dividend data as the predetermined effective data width "n" without detecting any effective data width "n". The processes after the setting of the effective data width "n" into the detector 7 are the same of those in the second or third embodiment.

It is acceptable to include the information as the process setting information to be stored in the mode register 12a, which specifies whether or not the instruction code information such as the size upper-limit value L of the dividend data is used, other than the information to specify whether or not the detection process of the effective data width of the dividend data is performed.

In a concrete example, as shown in FIG. 12, the size information detector 6b stores both the size upper-limit value L of the dividend data and the data length to be handled by the processor of the data processing device. In this case, when the process setting information includes data to specify that the detection function for the effective data width of the dividend data is invalid and data to specify that the use of the instruction code information such as the size upper-limit L of the dividend data is invalid, the size information detector 6b sets the 32 bit data as the effective data width "n" into the loop iteration completion detector 7 without using the size upper-limit value L of the dividend data as the effective data width "n".

Further, when the process setting information includes data to specify that the detection function for the effective data width of the dividend data is invalid and data to specify that the use of the instruction code information such as the size upper-limit L of the dividend data is valid, the size information detector 6b sets the size upper-limit value L of the dividend data as the predetermined effective data width "n" into the loop iteration detector 7.

As described above, according to the data processing device of the fourth embodiment, because one of the following processes can be selected, it is possible to obtain the same effect of the second embodiment without forming any size information field in the instruction format:

The process to determine the instruction cycle number based on the effective data width of the dividend data; and The process to determine the instruction cycle number based on the data width which has been determined in advance.

In addition, the fourth embodiment can select optionally how to determine the instruction cycle number and can also determine the instruction cycle number according to the type of the arithmetic instruction optionally.

As set forth in detail, according to the present invention, the data processing device has the instruction decoder for decoding instruction codes of an arithmetic instruction, the controller for detecting the effective data width of the operation data to be processed according to the decode result from the instruction decoder and for determining the instruction cycle number corresponding to the effective data width, and the operation unit, for executing the operation of the instruction with the instruction cycle number determined by the controller. Therefore it is not necessary to set the effective data width in advance to the instruction code every operation data and it is possible to optionally select the optimum instruction cycle number of obtained from the effective data width for each operation data during the execution of the arithmetic instruction.

Further, according to the present invention, it is possible to eliminate the limitation of the instruction code because the instruction code information to control the instruction cycle number for the arithmetic instruction is stored into the memory in the data processing device, and the instruction cycle number corresponding to the effective data width of the operation data to be processed in the arithmetic instruction is determined based on the instruction code information, or because the instruction code information to control the instruction cycle number is stored in the memory such as the mode register, and the operation process is performed based on the information stored in the memory.

The invention claimed is:

1. A method of execution of a divide instruction for a data processor, comprising the steps of:
    determining whether a dividend instructed in the divide instruction is a signed form number or an unsigned form number based on the divide instruction;
    determining an uppermost bit location, which has a first value when the dividend is unsigned data or when the dividend is signed data and a sign of the dividend data is positive, and which has a second value when the dividend is signed data and the sign of the dividend data is negative;
    determining a data size of the dividend during an execution of the divide instruction based on the determined uppermost bit location in the dividend; and
    executing a divide calculation based on the divide instruction,
    wherein a calculation cycle count of the divide calculation is determined depending on the data size of the dividend.

2. A method of execution of a divide instruction for a data processor, comprising the steps of:
    decoding the divide instruction;
    determining a data size of a dividend instructed in the divide instruction during an execution of the divide instruction; and
    executing a divide calculation based on a decode result of the divide instruction,
    wherein a calculation cycle count of the divide calculation is determined depending on the data size of the dividend,
    wherein the divide instruction contains information indicating whether the dividend is the signed form number or the unsigned form number, and
    wherein the data size of the dividend is determined based on the information in the divide instruction.

3. The method of claim 1, wherein the data size of the dividend is determined based on information indicating a size upper limit value of the dividend.

4. The method of claim 2, wherein the data size of the dividend is determined based on information indicating a size upper limit value of the dividend.

* * * * *